United States Patent [19]
Itai et al.

[11] Patent Number: 5,880,709
[45] Date of Patent: Mar. 9, 1999

[54] IMAGE PROCESSING DEVICES AND METHODS

[75] Inventors: Katsunori Itai; Yu Suzuki, both of Tokyo, Japan

[73] Assignee: Kabushiki Kaisha Sega Enterprises, Tokyo, Japan

[21] Appl. No.: 520,832

[22] Filed: Aug. 29, 1995

[30] Foreign Application Priority Data

Aug. 30, 1994 [JP] Japan .................................. 6-205805

[51] Int. Cl.⁶ .................................................. G09G 5/00
[52] U.S. Cl. ............................. 345/113; 345/127; 463/31
[58] Field of Search .................................. 345/127, 129, 345/130, 131, 145, 146, 113; 395/334, 342; 463/30, 31; 273/333, 348, 148

[56] References Cited

U.S. PATENT DOCUMENTS

| | | | |
|---|---|---|---|
| 4,668,947 | 5/1987 | Clark, Jr. et al. | 345/162 |
| 4,831,556 | 5/1989 | Oono | 345/127 |
| 4,978,303 | 12/1990 | Lampbell | 434/258 |
| 5,162,779 | 11/1992 | Lumelsky | 345/139 |
| 5,310,192 | 5/1994 | Miyake | 273/310 |
| 5,351,966 | 10/1994 | Tohyama et al. | 273/311 |
| 5,401,025 | 3/1995 | Smith, III et al. | 273/148 |
| 5,456,157 | 10/1995 | Lougheed et al. | 364/423 |
| 5,465,982 | 11/1995 | Rebane | 273/433 |

FOREIGN PATENT DOCUMENTS

WO 89/06030  6/1989  WIPO.

OTHER PUBLICATIONS

IBM Technical Disclosure Bulletin, New York, vol. 28, No. 8, Jan. 1986.

*Primary Examiner*—Steven J. Saras
*Assistant Examiner*—Xu-Ming Wu
*Attorney, Agent, or Firm*—Finnegan, Henderson, Farabow, Garrett & Dunner, L.L.P.

[57] ABSTRACT

An image processor is composed of a game device body, an operation panel and a display. The game device body is composed of a data processor 11 and a memory 12. The data processor 11 realizes a hit determining circuit 111, an enemy control circuit 112, an enemy (object) set circuit 113, a cursor control circuit 114, an enemy retrieval circuit 115 and a camera control circuit 116 in accordance with corresponding programs used. When an object is displayed on the display, the cursor control circuit 114 displays a cursor in accordance with predetermined processing performed on the basis of data on the coordinates of the object. The camera control circuit 116 performs a zoom-in display process for the object when the object is displayed on the display.

15 Claims, 8 Drawing Sheets

IMAGE PROCESSING DEVICES AND METHODS

BACKGROUND OF THE INVENTION

The present invention relates to image processing devices and methods, and more particularly to an image processing device and method for a video game. Still more particularly, the present invention relates to improvements of the techniques for facilitating identification of characters displayed on a display.

Conventionally, image processing has been applied in many fields. Recently, a new image processing technique has been established in the field of video game devices. Conventional game processing devices are generally composed of a game device body which executes various game programs stored beforehand, a peripheral device controller which gives operation commands to the respective elements of the game device body, and a display which displays the result of the processing performed by the game device body.

The game processing devices of this type are constructed so as to perform a desired processing operation through the peripheral device controller on the characters displayed on the display. For example, the player visually identifies a character as an attacked object displayed on the display, and manipulates a gun unit to make a predetermined attack on the identified character. The game device body determines success or failure in the attack on the basis of whether the attack has been made appropriately.

Conventionally, the player cannot easily identify a character which is subjected to image processing because the character is displayed in a small size on the display screen or a plurality of characters is displayed simultaneously. In order to clearly display a character to the player in the field of video game devices, several improvements have been tried. For example, in order to facilitate the identification of the character, a cursor which identifies the character is displayed on the display screen such that the cursor is moved along with the character. In addition, when an attack on the character fails, the character is displayed in an enlarged scale.

In the field of video game devices, however, the content of the game becomes sophisticated and the speed at which the game picture is developed increases. Thus, in the conventional character display techniques, it is difficult to display the character such that it is identified easily and rapidly. Even when the identification of the character is facilitated in the conventional game processing devices, an auxiliary display for the player to predict the next movement of the character has not been allowed for.

It is therefore an object of the present invention to provide an image processing device and method which is capable of easily and rapidly identifying a character displayed on the display screen and of predicting the next movement of the character.

SUMMARY OF THE INVENTION

In order to achieve the above objects, the present invention provides an image processor for performing image processing to display a character on a display, comprising:

mark displaying means for displaying a mark to indicate the character on the display;

mark moving means for moving the mark so as to indicate the character; and mark display state changing means for changing a displayed state of the mark depending on the advancement of the image processing state of the character.

According to this invention, the mark displayed by the mark displaying means is moved by the mark moving means to a position where the character is indicated by the mark. Simultaneously, the displayed state of the mark changes depending on the advancement of the processed image state of the character, so that the mark is displayed such that the character's position and processed image state are recognized together.

The mark displaying means may display the mark in the form of a frame which surrounds the character such that the character is recognized easily.

The mark moving means may comprise character coordinate reading means for reading a coordinate position of the character to move the mark near the coordinate of that position.

According to this invention, since the mark moves in correspondence to the coordinate position of the character, the mark captures the position of the character at all times.

The image processor may comprise character display scale factor changing means for changing a display scale factor of the character in steps corresponding to the displayed state of the character.

According to this invention, since the display scale factor of the character is changed in steps corresponding to the displayed state (for example, the effective or ineffective state) of the character, the character is zoomed-in on only when the character is to be noted.

The mark display state changing means may comprise mark display scale factor changing means for changing, in steps, the display scale factor of the mark which indicates the character in correspondence to the displayed state of the character.

According to this invention, the display scale factor of the mark is changed in correspondence to the displayed state of the character, and the mark is zoomed-in as requested.

The display scale factor changing means may change the display scale factor of the mark in correspondence to the display scale factor of the character.

According to this invention, the character corresponds in its display scale factor to the mark. The image of the character is either displayed as being zoomed-in on or out by a camera.

The display scale factor enlarging means may comprise display scale factor enlarging means for enlarging the display scale factor of the mark in steps when a predetermined character is displayed as the character.

According to this invention, when a predetermined character (for example, an effective character) is displayed as the character, it is zoomed-in on.

The display scale factor changing means may comprise display scale factor reducing means for reducing the display scale factor of the mark in steps when a predetermined character is displayed as the character.

According to this invention, when a predetermined character (for example, an ineffective character) is displayed as the character, it is zoomed out.

The display scale factor changing means may enlarge the display scale factor of the mark in steps when a first character is displayed as the character, and reduces the display scale factor of the mark in steps when a second character is displayed as the character.

According to this invention, when the first character is displayed (in an effective state), the mark zooms in, while when a second character is displayed (in an ineffective state), the mark is zoomed out.

The mark display state changing means may comprise color changing means for changing the displayed color of the mark.

According to this invention, the displayed color of the mark changes.

The mark display state changing means may comprise pointer position changing means for displaying a pointer along with the mark and changing the displayed position of the pointer relative to the position of the mark.

According to this invention, the pointer's changing displayed position relative to the position of the mark is displayed, and changes in time, for example, in the timer, or changing conditions, are displayed.

In another aspect, the present invention provides an image processor for performing image processing to display a character on a display, comprising:

mark displaying means for displaying a mark to indicate a character on the display;

mark moving means for moving the mark so as to indicate the character;

pointer position changing means for displaying the mark along with a pointer and changing the displayed position of the pointer relative to the mark; and color changing means for changing the displayed color of the mark in correspondence to changes in the displayed position of the pointer which is changed by said pointer position changing means.

According to this invention, the color of the mark changes depending on changes in the relative position of the pointers, so that the time, or the degree of urgency involved in a change in the situation, can be reported to the player.

The pointer position changing means may display a plurality of pointers along with the mark at different positions and changes the respective displayed positions of the pointers relative to the mark.

According to this invention, by instantaneously changing positions of the pointers, the immediate changing situation is displayed.

The image processor may comprise character changing means for changing the display of the character which the mark indicates from a first character to a second character when the displayed positions of the respective pointers relative to the mark are caused to substantially coincide by said pointer position changing means.

According to this invention, when both the displayed positions of the pointers substantially coincide, display of the character is changed. For example, a first and a second character which respectively express a standing and a shot-down character, may be used in a game involving shooting the first character down when a gun unit is sighted on the first character.

The image processor may comprise a display for displaying the states of processing performed by said respective means.

The results of the processing performed by the respective means are displayed on the display.

In a further aspect, the present invention provides an image processing method for displaying a character on a display, comprising the steps of:

displaying on the display a mark which indicates the character;

moving the mark so as to indicate the character;

changing a display scale factor of the character indicated by the mark; and changing the displayed state of the mark depending on the processed image state of the character.

According to this invention, when the display scale factor of the character changes, image processing is performed in which the displayed state of the mark changes depending on a change in the display scale factor.

DESCRIPTION OF THE PREFERRED EMBODIMENTS

Figure 1:
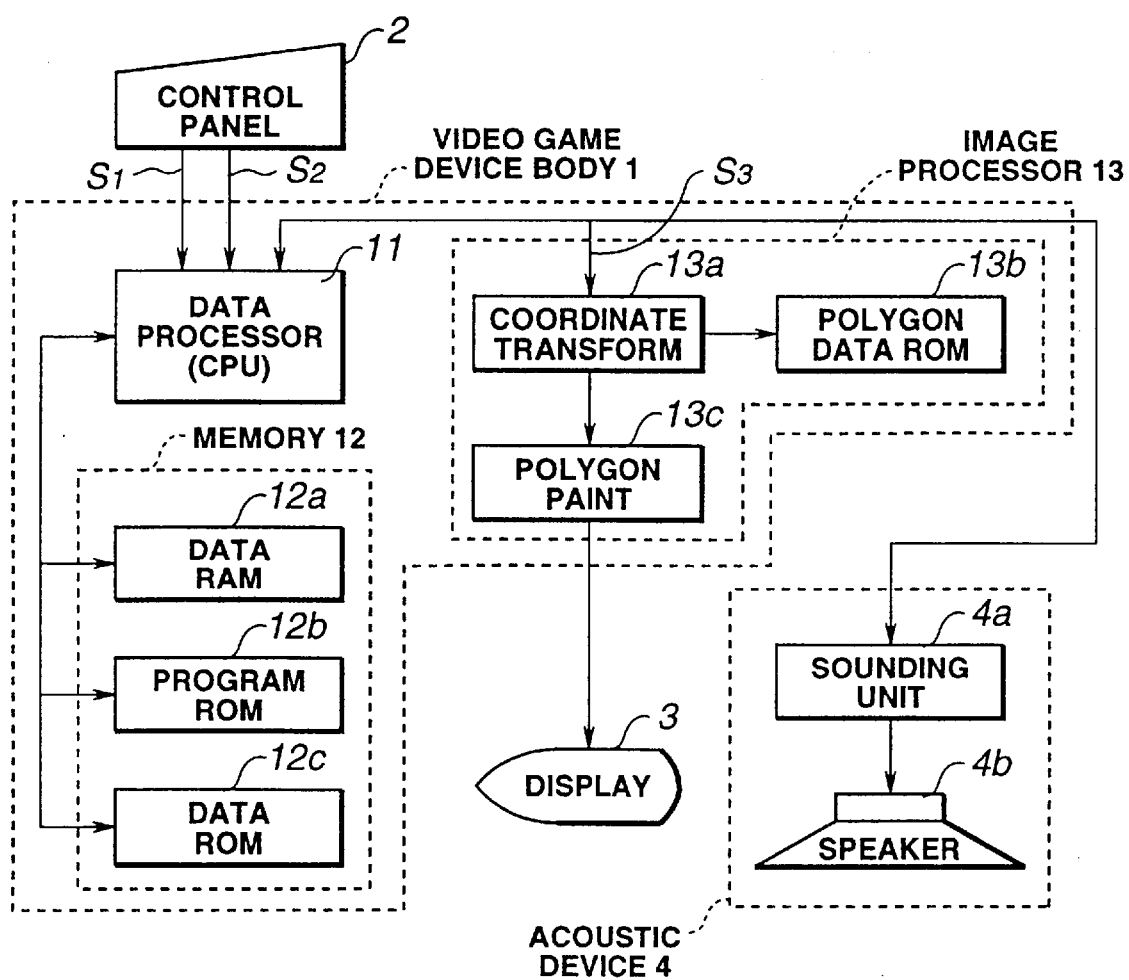
FIG. 1 is a block diagram indicative of an embodiment of an image processor according to the present invention.

An embodiment of the present invention will be described with reference to the accompanying drawings. FIG. 1 is a block diagram indicative of a video game device to which the image processing device (image processor) according to the present invention is applied. The video game device of FIG. 1 is a mainly composed of a video game device body 1, an operation panel 2, a CRT display 3, an acoustic device 4, which is composed of a sounding unit 4a including a voice synthesis unit, and a speaker 4b.

The video game device body 1 is composed of a data processor 11, a memory 12, and an image processor 13. The data processor 11 includes a central processing unit (CPU) which fetches a predetermined program and data from the memory 12 and performs processes for playing desired games, and other data processing, and stores required data in the memory 12. The memory 12 includes a data RAM 12a which stores data required for playing games, a program ROM 12b which contains programs, and a data ROM 12c which contains required data. Since a character is composed of a plurality of polygons in the video game device, a quantity of polygon data enough to specify the position of the character is contained in the data ROM 12a.

Figure 2:
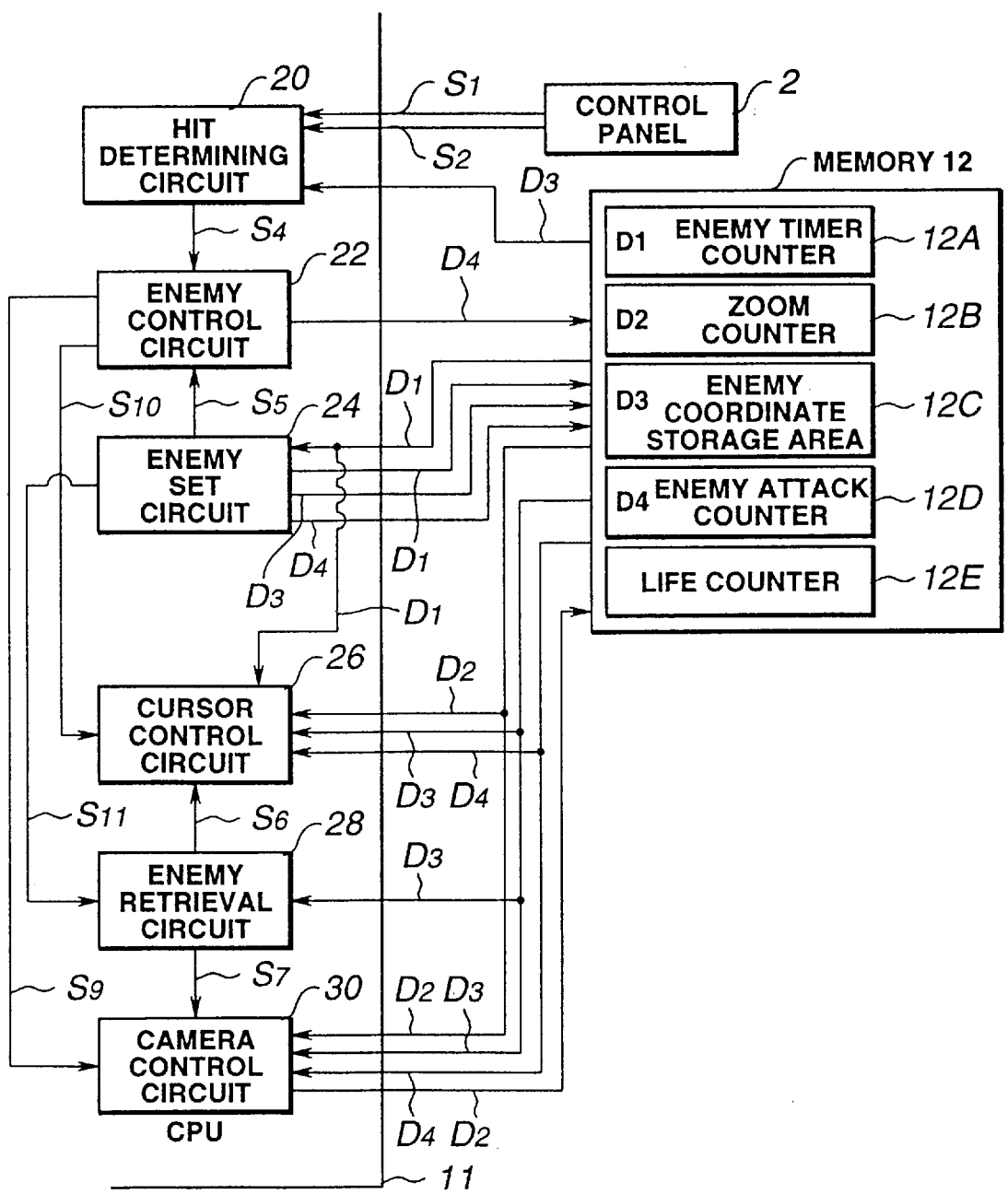
FIG. 2 is a block diagram indicative of the details of a data processor in the embodiment.

The data processor 11 operates on the basis of predetermined programs stored in the memory 12 to provide the player with a game which includes attacking with the gun unit a character which is an attack object (hereinafter referred to as an "enemy") displayed on the display screen. The data processor 11 realizes a display which further clarifies and facilitates the identification of the displayed character in the course of this processing. As will be described in greater detail later, the data processor 11 realizes functional blocks which perform those operations (for example, a hit determining circuit), as shown in FIG. 2.

The data ROM 12c of the memory 12 contains rough data on three-dimensional coordinates which are used to define enemies, other characters and a background scene in a virtual space, and data on the position, angle and direction of a visual point (camera) which displays those enemies, etc.

The data processor 11 calculates data S3 on an image viewed from a predetermined camera position, angle and orientation on the basis of this data and outputs the image data S3 to the image processor 13, which is composed of a coordinate transforming device 13a which performs a coordinate transforming process to generate an image to be displayed on the display 3 under the control of the data processor 11, a polygon data ROM 13b which contains detailed polygon data required for the coordinate transforming process, and a polygon paint circuit 13c which performs a texture mapping operation on the respective objects which have been subjected to the coordinate transforming by the coordinate transforming device 13a to provide the objects with required colors.

The polygon data ROM 13b contains polygon data (on vertex coordinates of polygons) in a body coordinate system which expresses the shapes, for example, of an enemy and a terrain which constructs a virtual image. The polygon data is finer than that contained in the data ROM 12c and is used to display a sophisticated image. The coordinate transforming device 13a coordinate-transforms polygon data read from the polygon data ROM 13b on the basis of image data S3 fed from the data processor 11 to display the image. Since the polygon data is defined in the body coordinate system which defines absolute coordinates of each object, the coordinate transforming device 13a performs matrix transforming to provide coordinates in the world coordinate system to define a virtual space. The polygon paint circuit 13c performs a painting process with designated colors on the respective objects which have been subjected to the coordinate transforming.

The operation panel 2 includes, for example, a gun unit (not shown), which, in turn, includes a trigger button which is used to transmit to the video game device body a signal indicative of the fact that the player has shot a projectile. The sight (or hit point) of the gun unit is defined by x and y coordinates on the display screen. When the player depresses a trigger switch in a state where the sight of the gun unit is set on any position on the display screen, the operation panel 2 outputs to the data processor 11 coordinate data S1 indicated by the set sigh when the trigger button was depressed and resulting trigger data S2.

The coordinates of the sight of the gun unit are defined as follows. The display screen is flashed to be placed, for example, in a high luminance state for one vertical blanking period of a video signal when the gun unit is triggered. The time interval is measured which is taken from the time when the gun unit has been triggered to the time when light from scanning lines on the display is detected by a photodetector provided in the gun unit. The measured time interval corresponds to the coordinates on the display screen to thereby indicate a position on the display screen on which the sight of the gun unit is set, and the position is expressed by x and y coordinates on the display screen. Until the scanning line arrives at the end point of the display screen, the detection of the light continues. Unless light is detected before the scanning line arrives at the end point of the display screen, it is determined that the sight of the gun unit is not set on any point on the display screen and the data processor performs its process by regarding calculation of the coordinates of the hit point as having not been performed.

The video game device provides a mark which facilitates the identification of a character on the display screen. Herein, the mark is expressed as a "cursor" for convenience of explanation. As described later in detail, the cursor takes the form of a circle which surrounds the character. One such cursor appears normally on the same display screen and moves along with an enemy as the game develops. When the character is displayed zoomed in or out, the cursor is also displayed zoomed in or out on the display so as to surround the zoomed-in or out character. The displayed shape of the cursor is changed depending on the state of the image processing for the character. The player is able to grasp the progress of the game by realizing a change in the displayed shape of the cursor.

In order to express such game environment, the memory 12 includes predetermined counter memories. As shown in FIG. 2, it includes an enemy timer counter 12A, a zoom counter 12B, an enemy coordinate storage area 12C, an enemy attack counter 12D, and a player's life counter 12E. Each counter is constructed such that a predetermined value is set therein and is decreased or increased, changed and stored in the course of the processing.

An enemy timer count is set in the enemy timer counter 12A to thereby indicate the remaining time before the next new enemy appears on the display screen. When the enemy timer count is decreased one by one in accordance with the respective steps of the process of FIG. 5 until the count becomes 0, the enemy set circuit 24 generates (or sets) a new enemy, which appears on the display screen. A zoom count is set in the zoom counter 12B and corresponds to the degree of zooming in on the character. As this count is larger, the enemy is displayed enlarged. For example, assume that the zoom count in the maximum zoom-in operation is defined as a maximum zoom count. When the zoom count is half of the maximum zoom count, an enemy is displayed at half of the maximum zoomed-in size.

The coordinates of the character displayed zoomed-in or out on the display are stored in the enemy coordinate storage area 12C. The memory 12 is also capable of updating and storing data on the coordinate position of the character in the course of the image processing.

An enemy attack count is set in the enemy attack counter 12D. This count corresponds to the time period from the appearance of the enemy to the start of an enemy's attack on the player. When the count is decreased to 0, it is determined that the player is damaged by the enemy's attack. A life count is set in the life counter 12E. This count corresponds to the degree of player's damage caused by the enemy. It is determined on the basis of that count whether the game can continue or not.

FIG. 2 is a functional block diagram indicative of the details of the respective data processing circuits realized by the data processor 11. The data processor 11 is composed of a hit determining circuit 20 which determines on the basis of data S1 and S2 from the gun unit whether the enemy is hit, an enemy control circuit 22, an enemy set circuit 24 which displays the enemy on the display, a cursor control circuit 26 which identifies the enemy, an enemy retrieval circuit 28 which retrieves data on the coordinate position of the enemy displayed on the display screen, and a camera control circuit 30 which controls the focal position, scale factor, position and angle of the camera for zooming purposes.

The hit determining circuit 20 receives data S1 on x and y coordinates, and trigger data S2 from the operation panel (gun unit) 2, and data D3 on three-dimensional coordinates of the enemy displayed on the display screen from the enemy coordinate storage area 12C. The hit determining circuit 20 determines the presence/absence of a hit to the enemy by simplifying the shape of the enemy schematically in a manner in which the shape of the enemy is evaluated easily. For example, assume that the shape of the enemy is expressed by a plurality of connected balls. Since each ball is expressed only by parameters including its radius and the coordinates of its center, it is considerably easily determined whether coordinates which specify the position of a projectile are contained in the range of a radius of an individual ball. This determination is performed for each ball. If any one of the balls is hit with a projectile, it is determined that the enemy has been hit or attacked successfully. If none of the balls is hit, it is determined that the attack of the enemy failed. The enemy coordinate storage area 12C is provided for each enemy to store data on a series of enemy's actions.

The enemy control circuit 22 performs a change of the enemy's position, and determination of the enemy's predetermined action and shot status on the basis of a signal S5 indicative of the appearance of the enemy on the display screen and a hit determining signal S4 output from the hit determining circuit 20. The enemy control circuit 22 displays the enemy on the basis of the coordinates of the enemy stored in the enemy coordinate storage area 12C, always monitors a hit determining signal S4 and performs a process for displaying that the enemy is hit when it is so determined. Data D3 on the enemy's position (coordinates) is updated and stored in the enemy coordinate storage area 12C of the memory 12. Enemy status signals S9 and S10 are output to the cursor control circuit 26 and camera control circuit 30, respectively.

The enemy set circuit 24 performs an initial setting operation for display of an enemy on the display screen. It reads a count D1 in the enemy counter 12A, sets a predetermined value in the counter 12A, and sets predetermined values D3 and D2 in the enemy coordinate storage area 12C and the zoom counter 12B, respectively. The enemy set circuit 24 outputs an enemy set end signals S11 and S5 to the enemy retrieval circuit 28 and the enemy control circuit 22, respectively.

Figure 10A:
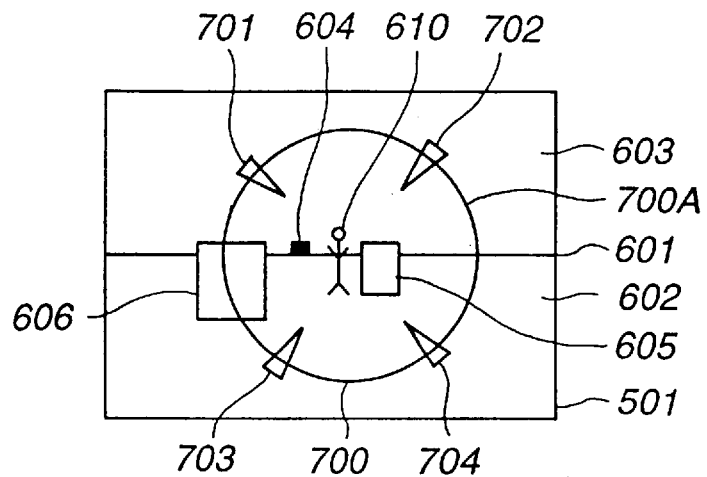
FIGS. 10A–10C illustrate an image displayed on a display screen of illustrating the operation of the embodiment.
Figure 10B:
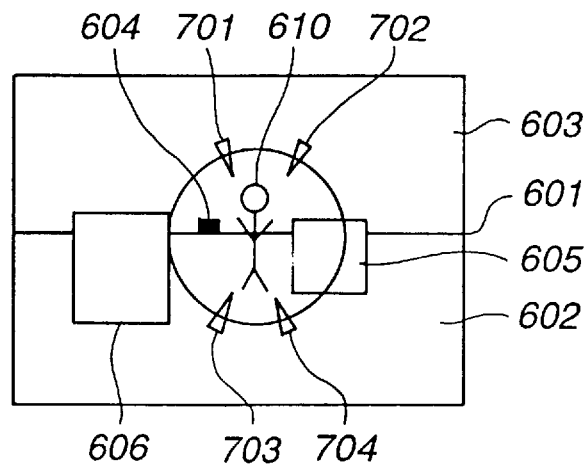
Figure 10C:
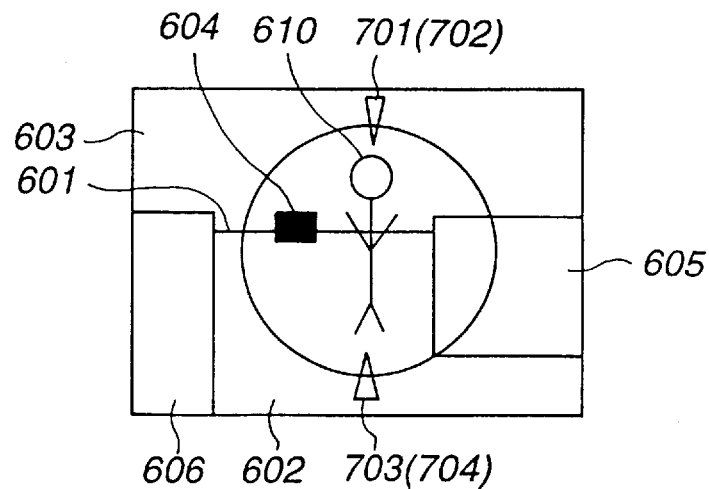

The cursor control circuit 26 performs a process for moving the cursor within the display screen and changes the display of the cursor in accordance with the state of the processing performed on the enemy. As will be detailed with respect to FIGS. 10A–10C later, the process for moving the cursor involves the movement of the cursor so as to indicate the enemy, for example, so as to surround the enemy as shown in this embodiment. The change of the display of the cursor involves a change of the processed state of the enemy, for example, sliding of cursor pointers 701–704 along the cursor line and a change of display color for the cursor in the course of zooming in on the enemy, as shown in FIGS. 10A–10C in this embodiment.

In order to perform these processing operations, the cursor control circuit 26 reads an enemy timer count D1 from the enemy timer counter 12A, enemy coordinates D3 from the enemy coordinate storage area 12C, a zoom count D2 from the zoom counter 12B, and an enemy attack count D4 from the enemy attack counter 12D to produce and output a cursor control signal to the image processor 13 to thereby move the cursor to a desired position on the display screen, and to change the display of the cursor including a change of the color of the cursor, a slide of the pointers, and enlargement of the cursor. The cursor control circuit 26 receives an enemy status signal S10 and an enemy appearance signal S6 from the enemy retrieval circuit 28.

The enemy retrieval circuit 28 retrieves the presence of an enemy on the display screen to output enemy appearance signals S8 and S7 to the cursor control circuit 26 and the camera control circuit 30, respectively. In order to retrieve an enemy, the enemy retrieval circuit 28 reads data D3 stored in the enemy coordinate storage area 12C of the memory 12 and an enemy set and signal S11 from the enemy set circuit 24.

In the retrieval of the enemy, enemies already displayed shot down by the player's attack which are among the enemies displayed on the display screen are not retrieved. Enemies which do not attack the player are excluded from the ones to be retrieved. In order to avoid confusion, it is preferable to program that enemies basically shoot at the player one at a time on the display screen.

As shown FIGS. 10A–10C, the camera control circuit 30 displays an enemy viewed from a predetermined visual point (camera) in a zoomed-in/out state. In order to perform this processing, the camera control circuit 30 reads data D2 in the zoom counter 12B of the memory 12, writes data in the counter 12B, and reads data D3 in the enemy coordinate storage area 12C and data D4 in the enemy attack counter 12D. The camera control circuit 30 also reads an enemy retrieval signal S7 from the enemy retrieval circuit 28 and an enemy status signal S9 from the enemy control circuit 22.

Figure 3:
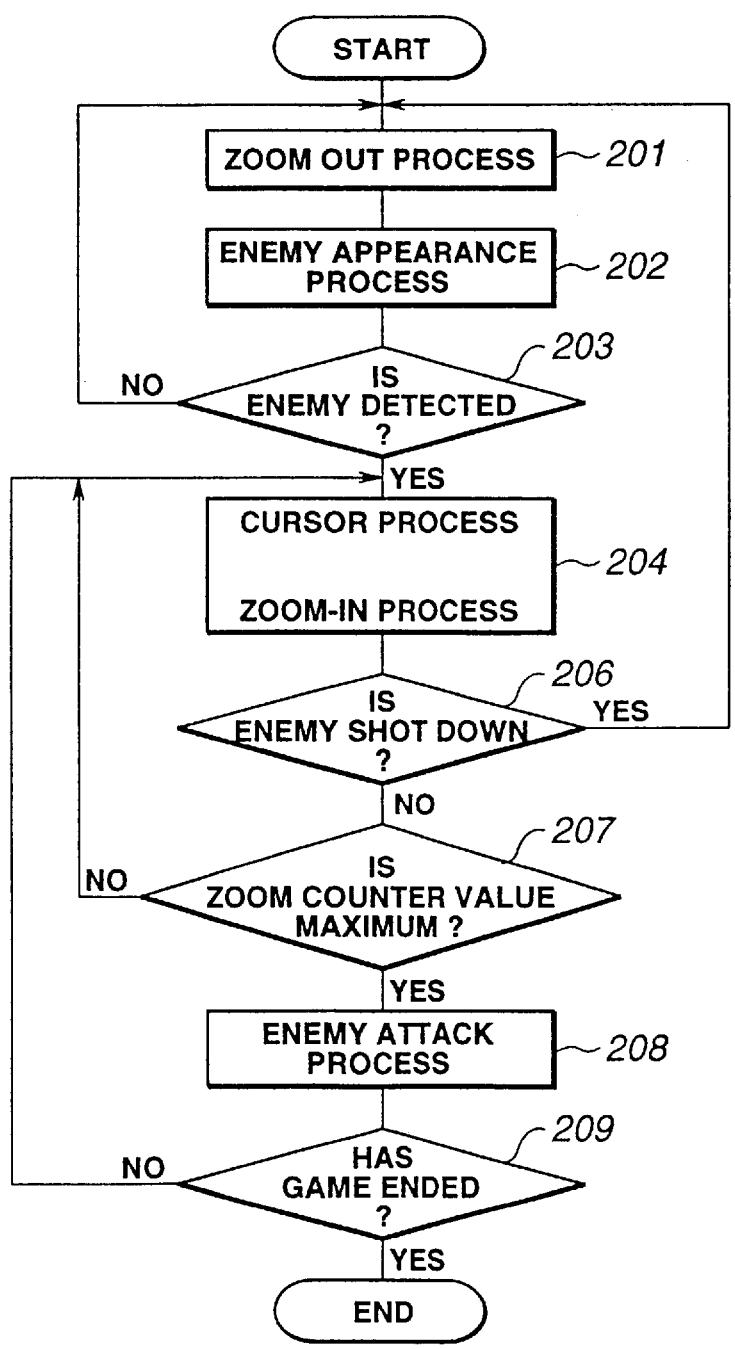
FIG. 3 is a flow chart indicative of the operation of the embodiment.

The operation of this embodiment will be next described with reference to flow charts of FIGS. 3–8. FIG. 3 is a schematic flow chart indicative of the operation of the embodiment and FIGS. 4–8 each are detailed flow charts indicative of the operation of the embodiment.

When the game device body 1 is started up, a routine of FIG. 3 starts. Thus, the data processor 11 performs a predetermined initial setting operation to realize respective functional circuits such as the hit determining circuit 20 of FIG. 2 in accordance with the programs stored in the memory 12.

The development of the game in this embodiment will be outlined next. First, when an enemy appears on the display screen, the cursor captures the enemy, and the camera control circuit 30 gradually zooms in on both the cursor and the enemy. The player manipulates the gun unit with appropriate timing to attack the enemy. When the attack on the enemy succeeds, the zoom-out operation continues until the next enemy appears, at which time the cursor again captures the new enemy and the camera control circuit 30 zooms in on the enemy. The player tries to attack the enemy each time it appears. The enemy comes to attack the player as the camera control circuit 30 zooms in on the enemy. When the enemy's attack on the player succeeds several times, the game ends.

Figure 4:
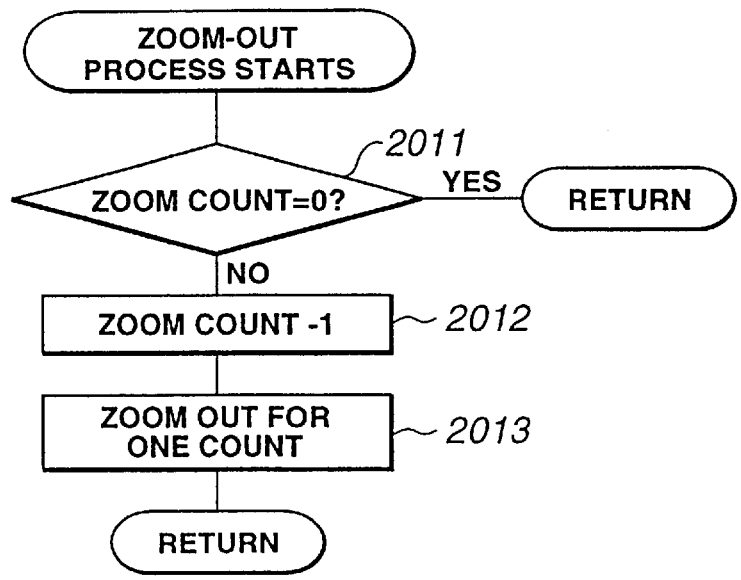
FIG. 4 is a flow chart indicative of the details of a zoom-out process performed in the embodiment.

Next, these game operations will be described more specifically. First, the camera control circuit 30 of the data processor 11 performs a gradual zoom-out process (step 201), which includes gradual reduction of the zooming scale factor to realize a display, for example, caused by moving the camera gradually away from the object because if the zoomed-in display is abruptly returned to a non-zoomed display when no enemies are detected or the enemy's attack has succeeded, an unnatural display would result. When a new enemy appear during the zoom-out operation, a process is performed in which the enemy is again zoomed in on or the scale factor again increases from the one used when the new enemy appeared. The details of the zoom-in operation are illustrated in FIG. 4. The camera control circuit 30 reads a zoom count D2 set in the zoom counter 12B of the memory 12 and determines whether the count D2 is 0, as shown in FIG. 4 (step 2011). If so (YES in step 2011), the camera control circuit 30 determines that the enemy is not in a zoomed-in state and the control exits the zoom-out process to pass to the next step. If the zoom count is not 0 (NO in step 2011), the camera control circuit 30 determines that the enemy is in a zoomed-in state, it decreases the zoom count by one and the control passes to step 2013 to perform a zoom-out operation for one count. The control then returns to the next process of FIG. 3.

In the data processor 11, the control passes to the processing performed by the enemy set circuit 24 and the enemy control circuit 22 to thereby performs an enemy appearance process (step 202) which includes causing an enemy to appear on the display screen, the details of which are described with reference to FIG. 5.

Figure 5:
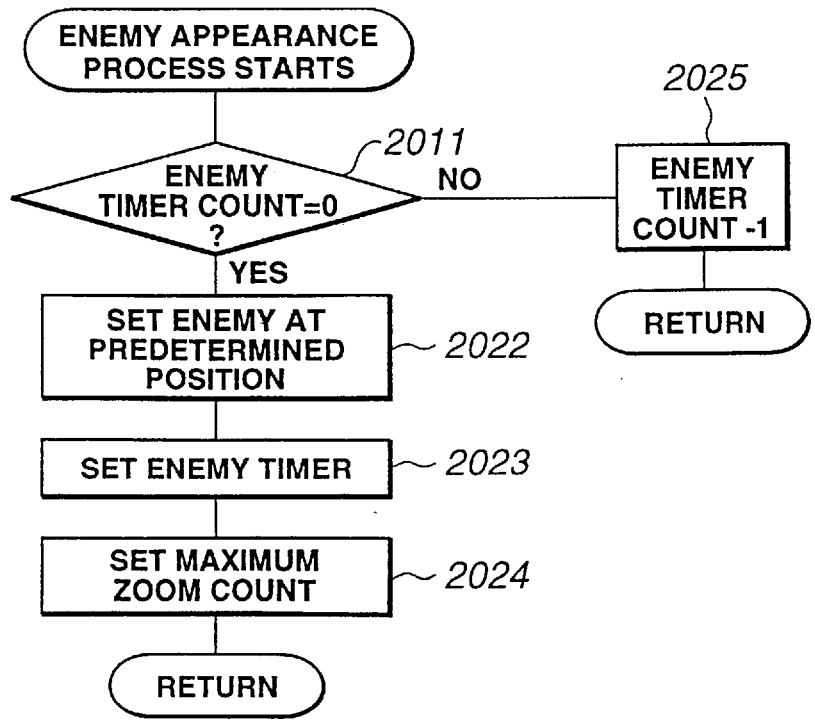
FIG. 5 is a flow chart indicative of the details of an enemy appearance process performed in the embodiment.

As shown in FIG. 5, the enemy set circuit 24 determines whether the enemy timer count D1 is 0 (step 2021). If so, the enemy set circuit 24 sets coordinates D3 of an enemy in the enemy coordinate storage area 12C such that the enemy appears at a predetermined coordinate position on the display screen (step 2022). The enemy set circuit 24 then sets a predetermined time period D1 in the enemy timer counter 12A (step 2023) and a maximum value D2 in the zoom counter 12B (step 2024). The control then exits the enemy appearance process to pass to the next step. If the enemy set circuit 27 determines that the enemy timer count is not 0 in step 2021, it determines that an enemy has already been displayed on the display screen and decreases the enemy timer count by one (step 2025).

The enemy timer counter is set when a new enemy is caused to appear at a predetermined position in the enemy appearance process, and maintains the same count until the zoom-out process (step 201) is performed. When the attack on the enemy succeeds, the enemy timer count is decreased in the enemy appearance process. When the count is 0, the next enemy is set.

The enemy retrieval process is then performed by the enemy retrieval circuit 28 (step 208). When the enemy retrieval circuit 28 receives from the enemy set circuit 24 an enemy detection signal S11 indicating that an enemy has been set by the enemy set circuit 24, it determines that the enemy has been detected (YES in step 203) and a cursor process starts (step 204). Unless the enemy retrieval circuit 28 receives the enemy detection signal S11, it determines that retrieval of the enemy has not ended. The control then returns to the zoom-out process 201. The enemy retrieval circuit 28 reads data on the enemy coordinates stored in the enemy storage area 12C of the memory 12 and performs an enemy retrieval process depending on whether the enemy is in a range of coordinates on the display screen. If so, the enemy retrieval circuit 28 determines that the enemy has been retrieved. Otherwise, the enemy retrieval circuit determines that the enemy has not been retrieved yet.

Figure 6:
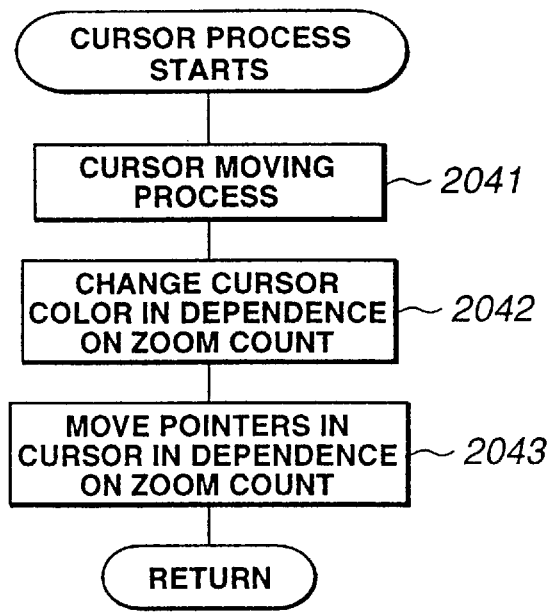
FIG. 6 is a flow chart indicative of the details of a cursor process performed in the embodiment.
Figure 7:
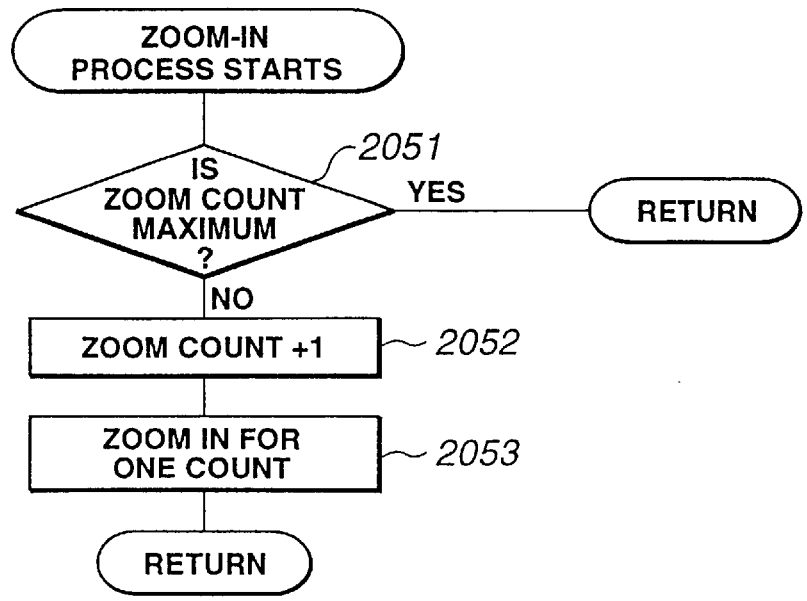
FIG. 7 is a flow chart indicative of the details of a zoom-in process performed in the embodiment.

The cursor process (step 204) is performed by the cursor control circuit 26. FIG. 6 shows the details of the cursor process, which includes fetching the zoom count D2, enemy coordinates D3, and enemy attack count D4, and the enemy status signal S10 from the enemy control circuit 22 and performs the cursor moving process on the basis of those signals (step 2041). In the cursor moving process, the cursor control circuit 26 reads data on enemy coordinates D3 displayed on the display screen to thereby cause the cursor to be displayed so as to indicate the character, i.e., so as to move the cursor towards the character and surround the character, as shown in FIGS. 10A–10C in the present embodiment, which will be described in greater detail later.

During the zoom-in process for the character (step 204), the color of the cursor is changed depending on the zoom count D2 (step 2042) and the pointers in the cursor are moved depending on the zoom count (step 2043). In addition, an enlarged or reduced-sized cursor is displayed depending on the zoom count.

Those displays of the cursor are changed depending on the degree of advancement of the processing for the enemy. As the zoom-in operation for the enemy advances, the cursor color is changed and upper and lower, right and left pointers (FIGS. 10A–10C) are slid along the cursor line such that those pointers coincide at the uppermost point on the cursor line and the cursor is displayed on an enlarged scale. The controlling operation of this cursor continues so long as the enemy attack count D4 read by the control circuit 26 is maintained. When the enemy's status signal S10 expresses a success in the attack on the enemy, the cursor control ends.

The data processor 11 causes the camera control circuit 30 to perform a zoom-in process in parallel with the cursor control operation (step 204). As shown in the detailed flow chart of FIG. 7, when the camera control circuit 30 begins this process, it fetches the maximum zoom count D2, enemy coordinates D3, enemy attack count D4 and the enemy status signal S9 from the enemy control circuit 22 as requested and determines whether the zoom count coincides with the maximum zoom count D2 (step 2051).

When the camera control circuit 30 determines that the zoom count is not the maximum one (NO in step 2051), it increments the count in the zoom counter by one (step 2052) to thereby cause the camera to zoom in for one count (step 2053). This process is then exited. When the camera control circuit 30 determines that the zoom count is at the maximum (YES in step 2051), the corresponding zoom-in process is performed. This camera control process continues like the cursor process so long as the enemy attack count D4 read by the cursor control circuit 26 is maintained. When the enemy status signal S10 expresses a success in the attack on the enemy, the camera control process ends.

Figure 8:
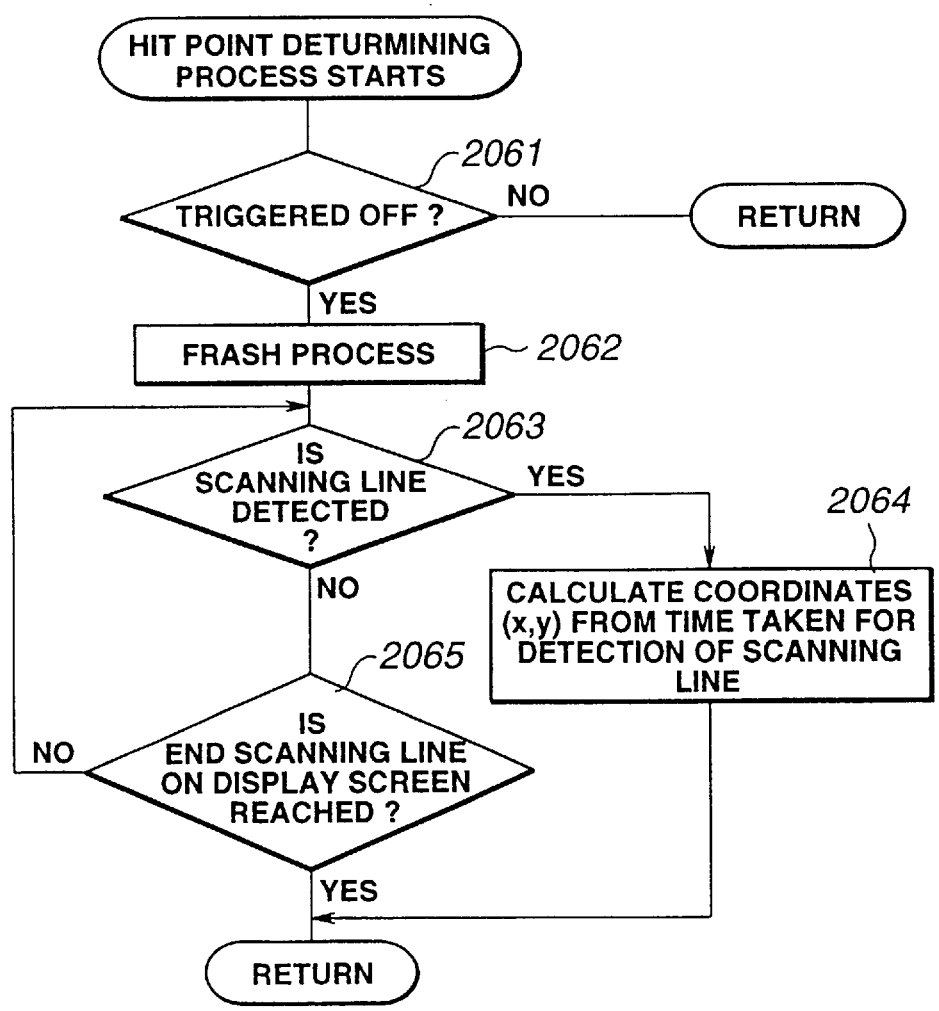
FIG. 8 is a flow chart indicative of a hit point determining process performed in the embodiment.

In step S206, the hit determining circuit 20 determines whether the enemy is hit, the details of which process are shown in a flow chart of FIG. 8. First, referring to data S2 delivered from the control panel 2 and indicating whether the trigger has been off, the hit determining circuit 20 determines whether the trigger button has been depressed by the player (step 2061). If not, there is no need for determining a hit, so that the control returns to the process of FIG. 3 and passes to the next step 207 of FIG. 3. If the trigger button has been depressed (YES in step 2061), a flash process is performed (step 2062). The flash process includes informing the player of the shooting of a projectile, supplying a sufficient quantity of light to a photodetector provided at an end of the gun unit and specifying the coordinates on which the sight of the gun unit is set. For the flash process, for example, the luminance of the whole image screen is increased for a predetermined vertical blanking period of the video signal as if a flash by a camera stroboscope was recognized. The scanning line sequentially scans the whole display screen from its upper left corner to its lower right corner during one vertical blanking period. Thus, so long as the gun unit is aimed at the display screen and when a scanning line scans a position on which the sight of the gun unit is set, a large amount of light is detected by the photodetector provided at the end of the gun unit. If the time passing from the starting point of the vertical blanking period when the photodetector has detected a detection signal is known since the scanning head position of the scanning line sequentially changes with time from the starting point of the vertical blanking period, the scanning head position of the scanning line on the display screen or the coordinates on the display screen on which the sight of the gun unit is set are known.

It is determined in step 2063 whether the scanning line has been detected immediately after the flash process is performed. If so, the coordinates of the sight of the gun unit are calculated on the basis of the time period from the starting point of the vertical blanking period where the flash process has been performed to the time where the scanning line has been detected (step 2064). If not in step 2063, it is determined whether the scanning line is the end line on the display screen (step 2065). So long as the scanning operation continues (NO in step 2065), the processes from step 2063 to 2065 are reiterated. When the scanning line equals the end line (YES in step 2065), it is determined that the sight of the gun unit is not set on the display screen although the trigger button has been depressed. The operation of the hit determining circuit 20 then returns and passes to the next step. When the hit determining circuit 20 determines that the enemy has not been shot down or hit in the process of FIG. 3 (NO in step 206), the camera control circuit 26 reads the zoom counter 12B to determine whether the maximum value is set in the counter 12B (step 207). When the hit determining circuit 20 determines that the enemy has been shot down or hit (YES in step 206), the control returns to the cursor process 204.

Figure 9:
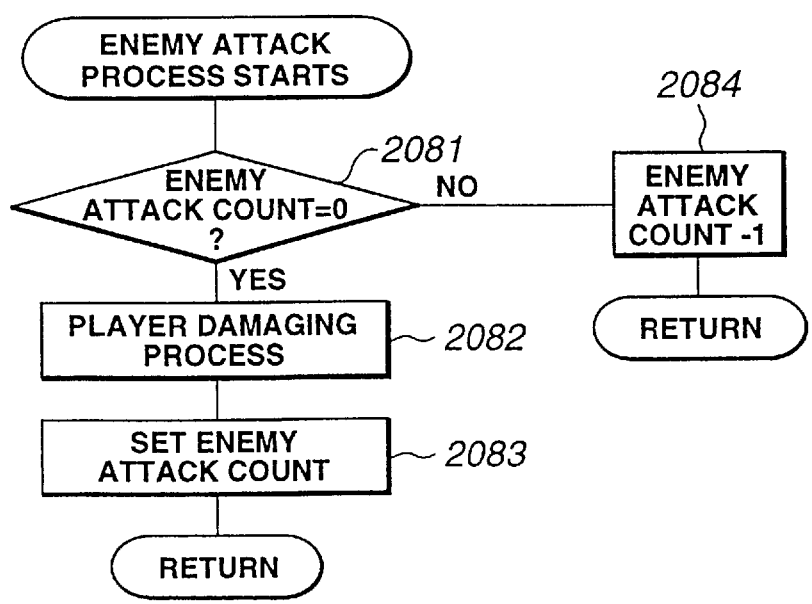
FIG. 9 is a flow chart indicative of the details of an enemy attack process performed in the embodiment.

When the camera control circuit 26 determines in step 207 that the count in the zoom counter has reached the maximum (YES in step 207), the enemy control circuit 22 performs an enemy attack process of FIG. 9 (step 208). When the control passes to the enemy attack process (step 208), the enemy control circuit 22 first determines whether the count in the enemy attack counter 12D is 0 (step 2081).

If so, a player damage process is performed to thereby decrease the count in the life counter 12E of the memory 12 by a predetermined value (step 2082). In addition, a predetermined value is set in the enemy attack counter (step 2083). If the enemy control circuit 22 determines that the count of the enemy attack counter is 0 (NO in step 2081), it decreases the count in the enemy attack counter by one (step 2084).

After the processing in steps 2083 and 2084, the control passes to step 209 of the flow chart of FIG. 3, where the data processor 11 reads the life count 12E of the player and determines whether the life count is 0. If so, it ends the game. If the life count is not 0, the control returns to step 204, where it continues to play the game.

FIGS. 10A–10C each show an example of a display screen provided by the above processing. Assume now that the game has started. The zoom count is then determined to be 0 (step 2011 of FIG. 4) and the enemy appearance process (step 202 of FIG. 3) is performed. In the enemy appearance process, the enemy timer count is 0. Therefore, the control passes through step 2021 to step 2022 to thereby set or display the enemy on the display screen at a predetermined position. The control further passes to step 2023, where a predetermined value is set in the enemy timer counter 12A and a maximum value is set in the zoom counter (step 2024). As a result, a picture of FIG. 10A with no cursor 700 is displayed on the display screen. In FIG. 10A, reference numeral 610 denotes an enemy and reference numerals 604, 605, 607 each denote a structure placed on the ground.

A process for seeking the enemy is then provided for the player (step 203). During the seeking of the enemy, the enemy timer is decreased by one (step 2025 of FIG. 5). When the enemy is sought, the cursor process (step 204) is performed in which a display screen where the identification of the enemy is facilitated by the cursor, or the enemy is surrounded by the cursor, is displayed. At the beginning of the cursor process, the cursor is displayed at the center of a plane in the three-dimensional space between the player and the enemy. The cursor then moves towards the enemy.

FIG. 10A shows an image corresponding to this situation. Reference numeral 700 denotes a whole cursor, reference numeral 700A denotes a circular cursor line, reference numerals 701–704 denote upper and lower, right and left pointers which slide along the circular cursor line. In the image of FIG. 10A, reference numeral 501 denotes the outer periphery of a display screen. Reference numerals 601–603 each denote a portion of a background image; i.e., the reference numeral 601 denotes a horizontal line, the reference numeral 602 denotes a ground, and the reference numeral 603 denotes a space above the ground. In the situation of FIG. 10A, the degree of zooming in on the character and hence the zoom count are small, so that the cursor color is unchanged with the cursor pointers being at corresponding positions shown.

A zoom-in process (step 204) is then performed. In this case, the zoom count is not a maximum, so that the control passes from step 2051 to 2052 in FIG. 7, where the count in the zoom counter is increased to provide a picture of FIG. 10B which has zoomed in for one count. In this case, when the control passes from FIG. 10A to FIG. 10B, the cursor process 204 continues to be performed to change the colors of the cursor line 700A and the upper and lower, right and left pointers 701–704 as well as to move the upper right and left pointers and the lower right and left pointers along the cursor line toward the uppermost and lowermost points, respectively, on the zoomed-in cursor line.

Then, it is determined in step 206 whether the attack on the enemy has succeeded. If so, an enemy to be attacked next is caused to appear on the display screen. After the completion of the attack on the enemy, it is determined that the zoom count is not 0 (step 2011 of FIG. 4), and the zoom count is decreased by one to thereby zoom out on the enemy accordingly (steps 2012 and 2013). As a result, the display screen of FIG. 10B is changed by zooming the display screen of FIG. 10A. Thus, the enemy appearance process (step 202), enemy detection process (step 203), cursor process (step 204), and zoom-in process (step 204) are performed for the next enemy.

When it is determined that the attack on the enemy has not succeeded in the state of FIG. 10B, the count in the zoom counter is not at the maximum. Thus, the control passes from step 207 to steps 204 and 206. In addition, a zoom count which has been increased by one is set in the zoom counter to thereby display a picture zoomed in by one count (FIG. 10C). During the zoom-in process, the upper, right and left pointers and the lower right and left pointers on the cursor line move toward the uppermost and lowermost points, respectively, on the zoomed-in cursor line so as to coincide at the uppermost and lowermost points when the zoom count is maximum. During the zoom-in process, the colors of the cursor line and the pointers are changed stepwise. As a result, the player can predict the moment at which the player is attacked by the enemy (step 208).

Since the zoom count is at its maximum in the state of FIG. 10C, the control passes from step 207 to step 208, where an attack on the enemy is made (step 208). In this case, since the count in the enemy attack counter is 0 at first, the player is determined to be attacked by the enemy. Thus, the count in the life counter is decreased by a predetermined value (step 2082 of FIG. 9) and a predetermined value is set in the enemy attack counter (step 2083).

When the count in the player life counter is the one before the end of the game, the control passes to step 204. Since the FIG. 3C state shows that the zoom counter is set at a maximum value, the enemy attack counter is decreased by one (step 2081) when the attack on the enemy fails (NO in step 206). By further performing the enemy attack process, so that the count in the enemy attack counter is sequentially decreased to reach 0, the control passes to step 2081–2083 to decrease the count in the player life counter. A predetermined value as a time interval before the player is next attacked by the enemy is then set in the enemy attack counter.

When the player's life count is decreased sequentially, it is determined that the continuation of the game is impossible, and the game ends (YES in step 209).

When the cursor 700 is displayed for the enemy 610 of FIG. 10 in the present embodiment, the cursor is moved from the coordinate position nearest the player on the display screen to the coordinate position of the enemy 610, and the position of the enemy on the display screen is confirmed while the enemy is being identified. Since in the present embodiment the enemy is simultaneously displayed enlarged by the zoom-in operation, the identification of the enemy and a predetermined operation (in the present embodiment, the attack from the gun unit) on the enemy are further facilitated.

The movement and colors of the pointers 701–704 on the cursor 700 are changed depending on the advancement of the image processing on the character or on the advancement of the flow chart of FIG. 3 in the present embodiment, so that the timing for the zoom-in operation and the next action of the character are predicted.

In the present embodiment, each time the enemy is shot down and the next enemy appears, the cursor 700 is moved from the shot-down enemy to the new displayed enemy, which is then zoomed in on. Thus, the player has such a feeling that successive enemies will attack the player. In the present embodiment, the enemy is zoomed in on in a short time, or the count set in the enemy timer counter is reduced, so that the time taken from the time of the appearance of the enemy to the start of the enemy attack process is reduced to thereby increase the degree of difficulty of the game.

According to the present embodiment, a newly displayed character is changed from its zoomed-in state to its zoomed-out state on the display screen, so that even when the new character is displayed, the character is identified while being zoomed in.

As described above, according to the present invention, the cursor is displayed on the display screen and moved so as to indicate a character, which is then zoomed in. Further, the displayed state of the cursor is changed depending on the advancement of the image processing state for the character, so that the player who views the display screen can identify the character by tracing the moving cursor. In addition, since the character is zoomed in on, the identification of the character is further facilitated. By changing the display of the cursor depending on the processed state of the character, the degree of advancement of the processed state of the character image is understood and the next action of the character is predicted.

By performing the zoom-in operation stepwise, the identification of the character is achieved stepwise as well. Since the coordinate position of the character is read and the cursor is moved to a position near the coordinate position of the character, the movement of the cursor to the character's position is ensured.

By performing at least one of the processes including changing the cursor color, displaying the pointers along with the cursor, changing the displayed position of the pointers, and enlarging and displaying the cursor, the degree of advancement of the character image processing is definitely comprehended.

When a new character is displayed on the display screen, the character is changed from a zoomed-in state to a zoomed-out state. Thus, when the new character is displayed, the new character is identified while being zoomed.

What is claimed is:

1. An image processor for performing image processing to display a character representing an object in a video game on a display, comprising:

mark displaying means for displaying a mark to indicate the character that is a present object on the display;

means for controlling a virtual camera that faces the character position in a game space;

mark moving means for moving the mark so as to indicate the character that is a next object; and mark display state changing means for changing a displayed state of the mark depending on the advancement of the image processing state for the character, wherein said advancement corresponds to progress made in said video game and wherein said mark display state changing means comprises mark display scale factor changing means for changing stepwise the display scale factor of the mark which indicates the character in correspondence to the displayed state of the character.

2. An image processor according to claim 1, wherein said mark displaying means displays the mark in the form of a frame which surrounds the character.

3. An image processor according to claim 1, wherein said mark moving means comprises character coordinate reading means for reading a coordinate position of the character to move the mark to near the coordinate of that position.

4. An image processor according to claim 1, comprising character display scale factor changing means for changing a display scale factor of the character stepwise in correspondence to the displayed state of the character.

5. An image processor according to claim 1, wherein said display scale factor changing means changes the display scale factor of the mark in correspondence to the display scale factor of the character.

6. An image processor according to claim 1, wherein said display scale factor changing means comprises display scale factor enlarging means for stepwise enlarging the display scale factor of the mark when a predetermined character is displayed as the character.

7. An image processor according to claim 1, wherein said display scale factor changing means comprises display scale factor reducing means for stepwise reducing the display scale factor of the mark when a predetermined character is displayed as the character.

8. An image processor according to claim 1, wherein said display scale factor changing means stepwise enlarges the display scale factor of the mark when a first character is displayed as the character, and stepwise reduces the display scale factor of the mark when a second character is displayed as the character.

9. An image processor according to claim 1, wherein said mark display state changing means comprises color changing means for changing the displayed color of the mark.

10. An image processor according to claim 1, comprising a display for displaying the states of processing performed by said respective mark displaying, moving and display state changing means.

11. An image processor for performing image processing to display a character representing an object in a video game on a display, comprising:

mark displaying means for displaying a mark to indicate the character that is a present object on the display;

means for controlling a virtual camera that faces the character position in a game space;

mark moving means for moving the mark so as to indicate the character that is a next object; and mark display state changing means for changing a displayed state of the mark depending on the advancement of the image processing state for the character, wherein said advancement corresponds to progress made in said video game and wherein said mark display state changing means comprises pointer position changing means for displaying a pointer along with the mark and changing the displayed position of the pointer relative to the position of the mark.

12. An image processor for performing image processing to display a character representing an object in a video game on a display, comprising:

mark displaying means for displaying a mark to indicate the character that is a present object on the display;

means for controlling a virtual camera that faces the character position in a game space;

mark moving means for moving the mark so as to indicate the character that is a next object;

pointer position changing means for displaying the mark along with a pointer and changing the displayed position of the pointer relative to the mark, wherein the change in the displayed pointer position corresponds to progress made in said video game; and color changing means for changing the displayed color of the mark in correspondence to a change in the displayed position of the pointer which is changed by said pointer position changing means.

13. An image processor according to claim 11 or 12, wherein said pointer position changing means includes means for displaying a plurality of pointers along with the mark at different positions, and means for changing the respective displayed positions of the pointers relative to the mark.

14. An image processor according to claim 13, comprising character changing means for changing the display of the character which the mark indicates from a first character to a second character when the displayed positions of the respective pointers relative to the mark are caused to coincide substantially by said pointer position changing means.

15. An image processor for performing image processing to display a character representing an object in a video game on a display, comprising:

mark displaying means for displaying a mark to indicate the character that is a present object on the display;

means for controlling a virtual camera that faces the character position in a game space; and mark display state changing means for changing a displayed state of the mark depending on the advancement of the image processing state for the character, wherein said advancement corresponds to progress made in said video game and wherein said mark display state changing means comprises mark display scale factor changing means for changing stepwise the display scale factor of the mark which indicates the character in correspondence to the displayed state of the character.

* * * * *